Feb. 16, 1943.　　　LE GRAND DALY　　　2,310,917

SELF-PACKING PISTON

Filed July 10, 1940

INVENTOR
LE GRAND DALY
BY
*Hyde and Meyer*
ATTORNEYS

Patented Feb. 16, 1943

2,310,917

UNITED STATES PATENT OFFICE 2,310,917

SELF-PACKING PISTON

Le Grand Daly, Port Clinton, Ohio

Application July 10, 1940, Serial No. 344,699

7 Claims. (Cl. 309—4)

The invention relates to improved packing or sealing means for pistons used in fluid pressure cylinders. It is particularly adapted to assistor cylinders for brake or clutch mechanisms, to air or liquid pumps, or to hydraulic cylinders for servomotors.

An object of the invention is to provide a hydraulic piston packing of greatly improved sealing capacity.

A further object is to provide such a packing of materially improved frictional characteristics.

A further object is to provide a packing which is an integral part of the piston itself so as to greatly simplify the construction and reduce the number of parts ordinarily required.

Further objects and advantages will be apparent on consideration of the following description and the drawing attached herewith in which Fig. 1 is a plan view of a piston, and sealing means associated therewith and forming an integrally united element thereof.

Figure 1:
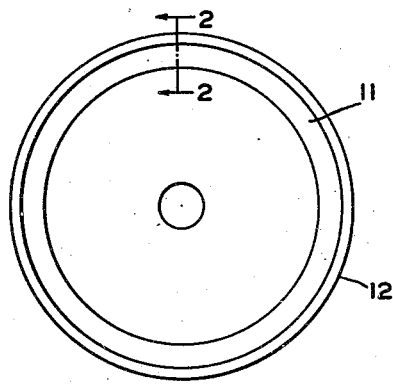

The invention essentially comprises a piston formed from a metallic body element to which is integrally bonded, welded, or united a resilient member which functions, simultaneously as an operative element of the piston and a sealing means therefor. In its preferred form the foundation element is a simple metallic disk of sufficient thickness to withstand the alternating stresses incident to reciprocation in its particular fluid pressure cylinder, and of diameter such that there may be superimposed upon and around its circumferential periphery a cylindrical flange member generally normal to said disk and adapted to maintain a sliding fit in said cylinder. Said flange member I form from one of a number of suitable resilient compounds such as the synthetic rubber compositions now available, of which, for purposes of illustration and not limitation, I may use one of the well known polymerized chloroprene derivatives. Compounds of this nature may be molded upon a metallic base so as to maintain a permanently adherent relationship thereto by one of a number of pressure molding or vulcanizing operations in manner well known to the art.

Since a number of specific advantages result from the particular contour of the resilient sealing member I will proceed to a description of several embodiments which are included within the scope of the appended claims.

Although in the drawing the resilient material is variously shown as extending sometimes radially inwardly over the whole face of the metallic disk, and sometimes only for a distance sufficient to assure a bonding area to maintain disk and packing in continued relationship, it will become apparent that this feature forms no essential part of the invention and that such immaterial variations result at times from matters of convenience in molding or otherwise forming the piston, and perhaps at times, from a desire to protect the metallic surface from abrasive or corrosive influences encountered in service. In the specific construction shown, for instance, in Figs. 4, 6, and 7, the resilient material, in conjunction with the connecting rod washer, seals the center aperture.

Figure 2:
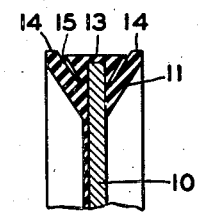
Fig. 2 is a section taken on the line 2—2 of Fig. 1, the view being somewhat enlarged to show the detail more clearly.

Fig. 1 illustrates a preferred embodiment of my invention in which a metallic disk 10 carries upon its outer edge an annular member 11 of resilient, rubber-like material, securely bonded to said disk. The outer peripheral face 12 of the annular member is substantially cylindrical although in preferred form an undercut portion 13 is spaced from two projecting lands 14 by angularly disposed, circumferential slots 15 in the bearing face, as best seen in Fig. 2. The depth of undercut is somewhat exaggerated in the drawing. In the embodiment shown the slots converge inwardly, paralleling the outer surface of the inwardly extending wall. The undercut contour may be impressed upon the peripheral face of the disk during the molding operation or it may afterwards be cut down or rubbed down in any suitable manner. The slots may be cut either before or after said cutting or grinding operation. If the undercut is molded in place, the slots can be formed thereafter.

Figure 3:
Fig. 3 is a section, in some respects similar to Fig. 2, but illustrating a somewhat modified form of the invention.

Fig. 3 illustrates a modification of the form shown in Fig. 2. It has only one projecting land 16 and an adjacent undercut portion 17 separated by a single slot 18.

Figure 4:
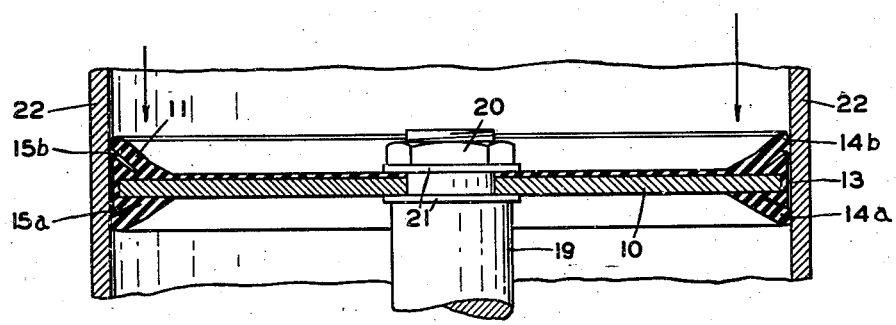
Fig. 4 is an incomplete section taken through a piston and cylinder to illustrate the relationship of the several operative parts.

Fig. 4 shows, in section, the embodiment shown in Figs. 1 and 2 in position in a cylinder. An operating member or connecting rod 19 is attached to the center of the piston disk in any conventional and convenient manner, such as by a retaining nut 20 on a threaded extension of rod 19, the disk being positioned between spacing washers 21.

The annular resilient member 11 serves as a packing or sealing member in slidable contact with the cylinder wall. As shown in Fig. 4 the undercut portion of the bearing face, designated by the numeral 13, in preferred form does not bear positively against the cylinder but merely acts as a spacer or stiffener to strengthen the structure and serve, by reason of its width, to prevent rocking resulting from offsetting tendencies in the piston rod. As the piston moves downwardly in the direction of the arrows in Fig. 4, the lower land, 14a, by frictional contact with the cylinder wall will have a tendency to close the lower slot 15a and draw land 14a into even closer contact with the cylinder wall. If the downward motion is imparted by tractive force on the connecting rod, and no compression exists above the piston, the upper land 14b will idly follow, and will exhibit a tendency to open slot 15b. If, however, the piston is being moved downwardly by compressive forces being exerted against the piston in the direction of the arrows, the effect of the compression causes the slots 15b to close, and causes land 14b to bear strongly against the cylinder wall.

Therefore in the embodiment shown in operation in Fig. 4, there is in operation a plurality of sealing forces, namely the sealing effect of the leading land, in this case 14a, and the sealing effect of the trailing land 14b especially when such land is under compression. In the embodiment shown in Figs. 2 and 4, the sealing forces act similarly even when the piston direction reverses, that is to say both lands act as effective sealing edges while the trailing land may augment this sealing effect when under compression. In the embodiment shown in Fig. 3, the main sealing effect is obtained from the seating of land 16 on the cylinder wall, and this seating effect is accentuated when the land 16 is on the compression side of the piston.

Figure 5:
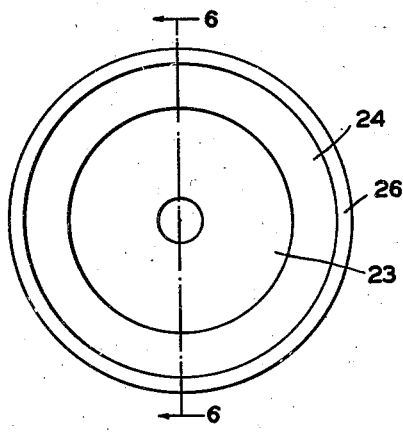
Fig. 5 is a plan view of a piston and somewhat modified form of packing arrangement.
Figure 6:
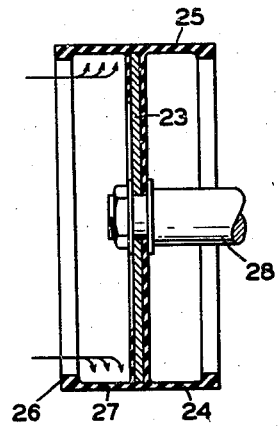
Fig. 6 is a section taken on the line 6—6 of Fig. 5.
Figure 7:
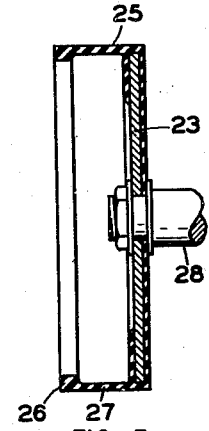
Fig. 7 is a view in some respects similar to Fig. 6 but illustrating a further modification of my invention.

A somewhat modified form of my invention is shown in Figs. 5, 6 and 7. In this modification a disk member carries upon its outer periphery a resilient flange member 24 of annular contour, the outer cylindrical face 25 of which is fitted to a sliding fit in a cylinder. The flange member, on its leading and trailing edges, is provided with an enlarged bead portion 26 to reinforce the annulus and prevent inward collapse of the upper edge thereof. It will be apparent that wall portion 27, being of reduced section thickness, readily responds to compressive forces exerted in the direction of the arrows as seen in Fig. 6, and, as a result, the wall is held closely against the cylinder by reason of what I term a "ballooning effect." This is true even if the piston is running idly, or under motive force supplied through the rod 28, which causes the cylinder to build up compression on the leading side. The trailing side maintains its illustrated contour. In the designs shown in Figs. 6 and 7, the "ballooning effect," by inducing improved sealing characteristics, avoids the necessity of extreme precision in finishing operations which was heretofore required on the sealing faces of packing members.

Fig. 7 shows still another modification in which the piston is of cupped form, but in operation during the compression half of a cycle its self-packing effect is similar to that just described for the design shown in Fig. 6.

In all the modifications shown the basic design is the same, namely, a metallic element to which is securely attached a resilient packing member of design such that in operation a novel and improved sealing effect is obtained. The embodiments illustrated in Figs. 1, 2, 3 and 4 are particularly suitable since the actual sealing contact in each case is restricted to a very narrow seat along the periphery of lands 14 and 16, and the frictional losses are proportionately reduced. The embodiment shown in Figs. 5, 6 and 7, on the other hand, might be considered as exhibiting normal frictional losses with greatly increased sealing characteristics.

What I claim is:

1. An improved self-sealing piston for operation in a fluid pressure cylinder comprising a nonyielding, discoidal body member having securely attached thereto an annular packing member molded completely over one face and a portion of the other face of said discoidal member and having a resilient relatively thin cylindrical flange portion extending beyond and perpendicular to the plane surface of said body member, said flange portion having upon its circumferential edge portion a thickened bead, said cylindrical flange portion forming, with said body portion, a pressure cup disposed to maintain an improved fluid sealing contact with a cylinder by reason of compressive forces developed during operation of said piston.

2. An improved self-sealing piston for operation in a fluid pressure cylinder comprising a nonyielding, discoidal body member having securely attached thereto an annular packing member of synthetic rubber molded completely over one face and a portion of the other face of said discoidal member and having a resilient cylindrical flange portion extending beyond and perpendicular to the plane surface of said body member, said flange portion having upon its circumferential edge portion a thickened bead, said cylindrical flange portion forming, with said body portion, a pressure cup disposed to maintain an improved fluid sealing contact with a cylinder by reason of compressive forces developed during operation of said piston.

3. An improved self-packing piston for operation in a fluid pressure cylinder, said piston comprising a relatively nonyielding body member having securely attached thereto an annular, resilient, packing member, said packing member having a peripheral bearing face for sliding contact with said cylinder, said bearing face being circumferentially slotted so as to provide a plurality of sealing lands of unequal heights, at least one of said lands being disposed to be maintained against the cylinder walls under increased pressure by forces developed during the reciprocation of said piston in said cylinder.

4. An improved self-packing piston for operation in a fluid pressure cylinder, said piston comprising a relatively nonyielding body member having securely attached thereto an annular, resilient, packing member of synthetic rubber, said packing member having a peripheral bearing face for sliding contact with said cylinder, said bearing face being circumferentially slotted so as to provide a plurality of sealing lands of unequal heights, at least one of said lands being disposed to be maintained against the cylinder walls under increased pressure by forces developed during the reciprocation of said piston in said cylinder.

5. An improved self-packing piston for operation in a fluid pressure cylinder, said piston comprising a relatively nonyielding body member having securely attached thereto an annular, resilient, packing member, said packing member having a peripheral bearing face for sliding contact with said cylinder, said bearing face being interrupted by inwardly converging circumferential slots so as to provide a plurality of sealing lands of unequal heights, at least one of said lands being disposed to be maintained against the cylinder walls under increased pressure by forces developed during the reciprocation of said piston in said cylinder.

6. An improved self-sealing piston for operation in a fluid pressure cylinder comprising a one piece, metallic, discoidal core member and an annular packing member of rubber-like material permanently bonded to said discoidal member around its circumferential periphery and completely over one face and a portion of the other face of said discoidal member and supported only by said discoidal member, the major portion of the bearing surface of said annular packing member extending beyond the plane of said discoidal member whereby said bearing surface retains, to a substantial extent, its inherent resiliency.

7. An improved self-packing piston for operation in a fluid pressure cylinder, said piston comprising a relatively nonyielding discoidal body member having securely attached thereto an annular, resilient, packing member molded completely over one face and a portion of the other face of said discoidal member, said packing member having a peripheral face for sliding contact with said cylinder, said bearing face being circumferentially slotted so as to provide a plurality of sealing lands of unequal heights, at least one of said lands being disposed to be maintained against the cylinder walls under increased pressure by forces developed during the reciprocation of said piston in said cylinder.

LE GRAND DALY.